(12) United States Patent
Kolacz et al.

(10) Patent No.: US 11,703,288 B2
(45) Date of Patent: Jul. 18, 2023

(54) HEADER FOR A HEAT EXCHANGER

(71) Applicant: Valeo Autosystemy Sp. z o.o., Skawina (PL)

(72) Inventors: Adam Kolacz, Skawina (PL); Dariusz Potok, Skawina (PL); Wojciech Matyszkowicz, Skawina (PL); Tomasz Lis, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 23 days.

(21) Appl. No.: 17/053,989

(22) PCT Filed: May 14, 2019

(86) PCT No.: PCT/EP2019/062285
§ 371 (c)(1),
(2) Date: Nov. 9, 2020

(87) PCT Pub. No.: WO2019/219644
PCT Pub. Date: Nov. 21, 2019

(65) Prior Publication Data
US 2021/0231392 A1  Jul. 29, 2021

(30) Foreign Application Priority Data
May 15, 2018 (EP) ..................... 18461557

(51) Int. Cl.
*F28F 9/18* (2006.01)
*F28D 1/053* (2006.01)
(Continued)

(52) U.S. Cl.
CPC ............ *F28F 9/18* (2013.01); *F28D 1/05366* (2013.01); *F28D 1/05308* (2013.01);
(Continued)

(58) Field of Classification Search
CPC .......... F28F 9/18; F28F 9/0248; F28F 9/0256; F28F 9/0246; F28F 9/0224;
(Continued)

(56) References Cited

U.S. PATENT DOCUMENTS 8,656,988 B1  2/2014 Paul et al.
9,599,413 B2 * 3/2017 Augenstein ............... F28F 9/02
(Continued)

FOREIGN PATENT DOCUMENTS

CN  102762947 A  10/2012
CN  107457325 A  12/2017
(Continued)

OTHER PUBLICATIONS

International Search Report and Written Opinion in corresponding International Application No. PCT/EP2019/062285, dated Aug. 12, 2019 (8 pages).
(Continued)

*Primary Examiner* — Joel M Attey
(74) *Attorney, Agent, or Firm* — Osha Bergman Watanabe & Burton LLP

(57) ABSTRACT

A header (10) for a heat exchanger, in particular for a charge air cooler, comprising an opening plane (12) with plurality of openings (14) for attachment of tubes, a collar (13) encircling the perimeter of the opening plane (12) and protruding at least partially above the opening plane (12), wherein the header (10) further comprises guiding protrusions (11a, 11b) located along inner perimeter of the collar (13) adjacent to said openings (14) and configured to guide the tubes into the openings (14) upon insertion, wherein the openings (14) have substantially rectangular shape with longer sides (14a) and shorter sides (14b) and are arranged in series along their longer sides (14a), wherein a first group of guiding protrusions (11a) is located adjacent the longer
(Continued)

sides (14*a*) of the openings (14), while a second group of guiding protrusions (11*b*) is located adjacent the shorter sides (14*b*) of the openings (14).

6 Claims, 2 Drawing Sheets

(51) Int. Cl.
    *F28D 21/00*      (2006.01)
    *F28F 9/02*      (2006.01)

(52) U.S. Cl.
    CPC .... *F28D 2021/0082* (2013.01); *F28F 9/0224* (2013.01); *F28F 9/0246* (2013.01); *F28F 9/0248* (2013.01); *F28F 9/0256* (2013.01); *F28F 2255/02* (2013.01); *F28F 2265/26* (2013.01); *F28F 2275/04* (2013.01); *F28F 2280/00* (2013.01)

(58) Field of Classification Search
    CPC .............. F28F 2275/04; F28F 2280/00; F28D 1/05366; F28D 1/05308; F28D 2021/0082
    See application file for complete search history.

(56) References Cited

U.S. PATENT DOCUMENTS

| | | | |
|---|---|---|---|
| 2007/0131385 A1* | 6/2007 | Misiak | F28F 9/02 |
| | | | 165/173 |
| 2011/0168364 A1* | 7/2011 | Okuyama | F28F 9/0226 |
| | | | 165/148 |
| 2011/0277975 A1* | 11/2011 | Falkingham | F28D 1/05383 |
| | | | 165/173 |
| 2017/0350661 A1* | 12/2017 | Turnbull | B21D 19/088 |

FOREIGN PATENT DOCUMENTS

| | | |
|---|---|---|
| EP | 2310789 A1 | 4/2011 |
| WO | 2009121531 A1 | 10/2009 |

OTHER PUBLICATIONS

First Office Action in corresponding Chinese Application No. 201980032777.7, dated Oct. 27, 2021 (13 pages).

* cited by examiner

_(12) United States Patent_ US 11,703,288 B2

HEADER FOR A HEAT EXCHANGER

FIELD OF THE INVENTION

The invention relates to a header for a heat exchanger. In particular the invention relates to a header for an automotive heat exchanger, in particular for a charge air cooler.

BACKGROUND OF THE INVENTION

There are known heat exchangers where a bundle of tubes is mounted in a fluid tight manner in a header, preferably in two opposite headers on each ending side of the tubes in the bundle. The headers are attached to tanks, so that a fluid communication can be achieved between them through said bundle of tubes. This is a case for example for charge air coolers or water charge air coolers.

European patent application EP2310789 discloses a heat exchanger which comprises fluid flow/heat-exchange elements, at least one fluid manifold into which the heat-exchange elements open, at least one header plate for holding the heat-exchange elements in place and at least one casing for accommodating the heat-exchange elements. The fluid manifold is held in place directly by the casing.

A problem has been observed in relation to assembly of tubes and headers. In particular, when a bundle of tubes is being inserted into openings in headers during assembly process, the outer-most tubes in the bundle sometimes collide with a collar of the header, which leads to deformation of tubes and/or the header. This can lead to leaks in the assembly, which renders the whole heat exchanger non-operational or non-efficient.

There is therefore a need to provide a header for a heat exchanger with tubes, which would solve the above-mentioned problem in a cost-effective and relatively easy to implement manner.

SUMMARY OF THE INVENTION

The object of the invention is a header for a heat exchanger, in particular for a charge air cooler, comprising an opening plane with plurality of openings for attachment of tubes, a collar encircling the perimeter of the opening plane and protruding at least partially above the opening plane, wherein the header further comprises guiding protrusions located along inner perimeter of the collar adjacent to said openings and configured to guide the tubes into the openings upon insertion, wherein the openings have substantially rectangular shape with longer sides and shorter sides and are arranged in series along their longer sides, wherein a first group of guiding protrusions is located adjacent the longer sides of the openings, while a second group of guiding protrusions is located adjacent the shorter sides of the openings.

Preferably, the collar has a rounded inside collar edge, the openings have rounded inside opening edges, and each guiding protrusion forms a flat surface which connects tangentially with the inside collar edge and the adjacent inside opening edges.

Preferably, the flat surface is inclined with respect to the opening plane at an angle of α, the α being comprised in the range 30-60°.

Preferably, the rounded inside collar edge has a radius R1, the rounded inside opening edges have a radius R2, and the radius R1 is bigger than the radius R2.

Preferably, the rounded inside collar edge has a radius R1, the rounded inside opening edges have a radius R2, and the radius R1 is equal to the radius R2.

Preferably, the guiding protrusions at the longer sides of the openings have a width p1, while the guiding protrusions at the shorter sides of the openings have a width p2, and the width p1 is equal to width p2.

Preferably, the guiding protrusions at the longer sides of the openings have a width p1 and are arranged in a distanced manner with respect to each other by a distance d, wherein ratio p1/d is 2/15.

Preferably, the guiding protrusions at the short sides of the openings are located substantially in the middle of those short sides.

The object of the invention is also a heat exchanger comprising a header as described above and/or below.

BRIEF DESCRIPTION OF DRAWINGS

Examples of the invention will be apparent from and described in detail with reference to the accompanying drawings, in which.

DETAILED DESCRIPTION OF EMBODIMENTS

Figure 1:
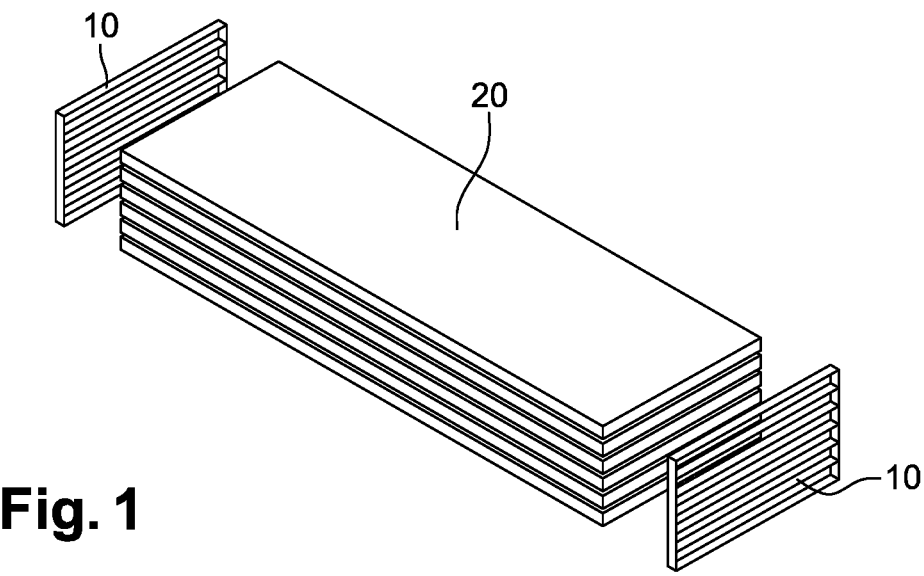
FIG. 1 shows an assembly of headers and tubes in an exploded view.

FIG. 1 shows an assembly of headers and tubes in an exploded view. The tubes 20 are generally grouped into a bundle and together form a conduit for a liquid. The tubes 20 are connected at both ends to headers 10. The headers 10 are adapted for receiving said ends of the tubes 20. The tubes 20 have generally rectangular cross-section, with rounded corners.

Figure 2:
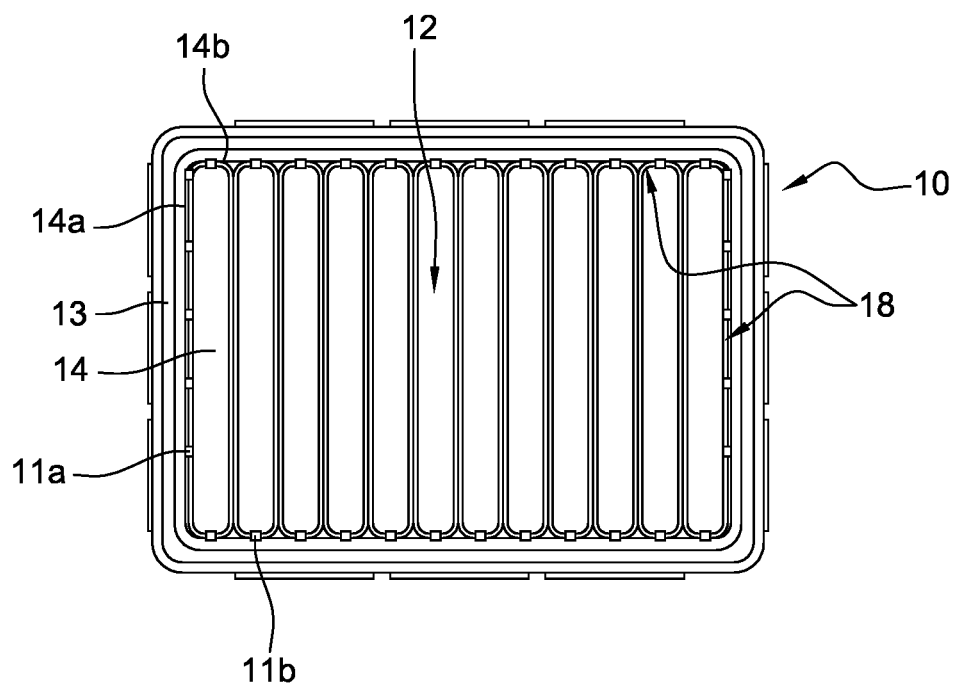
FIG. 2 shows a header in a top view.

FIG. 2 shows a header 10 according to the invention in a top view. Header 10 comprises an opening plane 12 with plurality of openings 14 for attachment of tubes. The tubes 20 can be introduced into these openings 14 and brazed, so that a fluid-tight connection is obtained. Header 10 further comprises a collar 13 encircling the perimeter of the opening plane 12. The collar 13 protrudes at least partially above the opening plane 12. Consequently, the opening plane 12 is located below the top surface of the collar 13, i.e. it is not at the same level, and an inner perimeter 18 of the collar 13 is created at the contact portion between the collar 13 and the opening plane 12. The header 10 further comprises guiding protrusions 11a, 11b located along the inner perimeter 18 of the collar 13 adjacent to the openings 14. The guiding protrusions 11a, 11b are configured to guide the tubes 20 into the openings 14 upon insertion. This means that even if the tubes 20 facing the openings 14 with adjacent guiding protrusions 11a, 11b are slightly shifted towards the collar 13, the guiding protrusions 11a, 11b will guide them so that they will enter the openings without any damage done to header 10 and/or tubes 20.

The openings 14 have substantially rectangular shape with longer sides 14a and shorter sides 14b and are arranged in series along their longer sides 14a. This arrangement corresponds to the general arrangement of tubes 20 in a bundle which are intended to be inserted into and connected to the header 10. A first group of guiding protrusions 11a is located adjacent the longer sides 14a of the openings 14, while a second group of guiding protrusions 11b is located adjacent the shorter sides 14b of the openings 14. This allows to prevent damage to collar 13 and/or tubes 20 along the whole inner perimeter of the collar 13 during insertion of the tubes 20.

Figure 3:
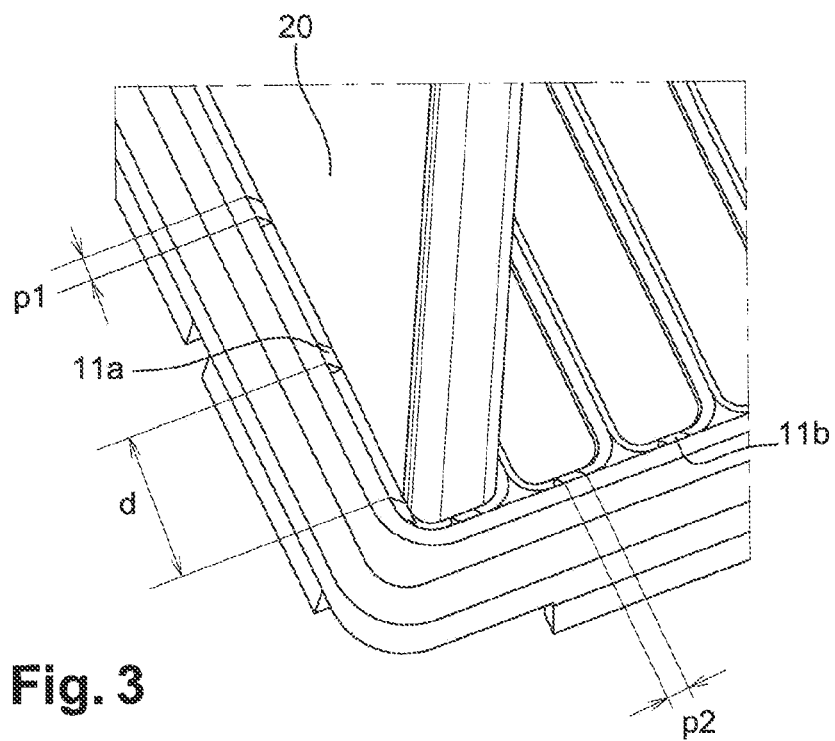
FIG. 3 shows a header with a tube inserted into an outer-most opening of the header.

FIG. 3 shows a header with a tube 20 inserted into an outer-most opening 14 of the header 10. The guiding protrusions 11a at the longer sides 14a of the openings 14 have a width p1. The guiding protrusions 11b at the shorter sides 14b of the openings 14 have a width p2. Preferably, the width p1 is equal to width p2.

Further, the guiding protrusions 11a at the longer sides 14a of the openings 14 have a width p1 and are arranged in a distanced manner with respect to each other by a distance d. Preferably, the ratio p1/d is 2/15.

Preferably, the guiding protrusions 11b at the short sides 14b of the openings 14 are located substantially in the middle of those short sides 14b. This maximizes the chance of proper insertion of tubes into the openings 14.

Figure 4:
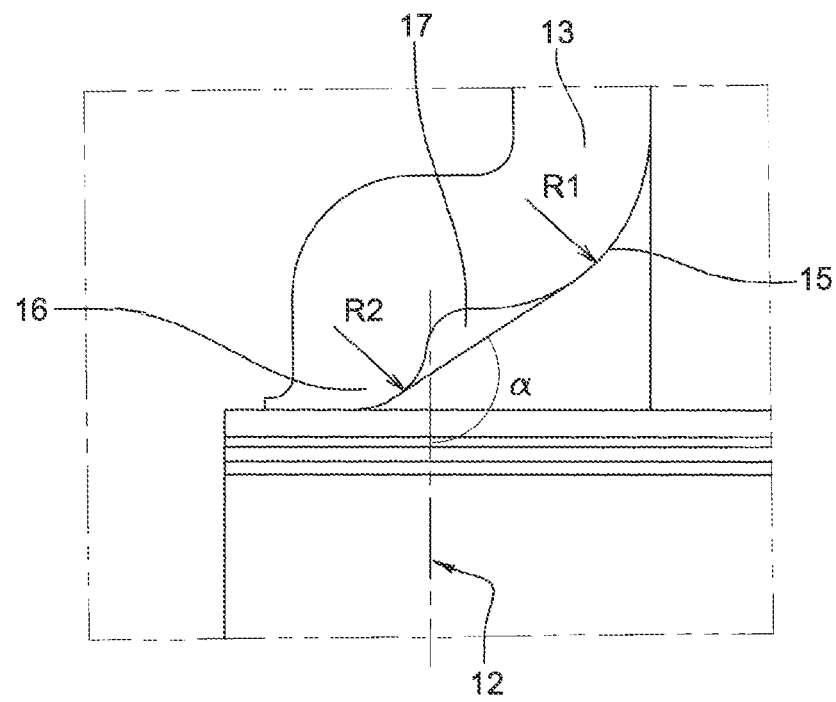
FIG. 4 shows a header with a tube in a closer view.

FIG. 4 shows a header 10 with an inserted tube 20 in a closer view. The collar 13 has a rounded inside collar edge 15. The openings 14 have rounded inside opening edges 16. Each guiding protrusion 11a, 11b forms a flat surface 17 which connects tangentially with the inside collar edge 15 and the adjacent inside opening edges 16. This facilitates the insertion of the tubes 20. The guiding protrusions 11a, 11b are manufactured by for example through stamping. Preferably, the flat surface 17 is inclined with respect to the opening plane 12 at an angle of a, the a being comprised in the range 30-60°. As can be seen in FIG. 3 the rounded inside collar edge 15 has a radius R1, while the rounded inside opening edges 16 have a radius R2. The radius R1 can be bigger than the radius R2. Alternatively, the radius R1 is equal to the radius R2.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

The invention claimed is:

1. A header for a heat exchanger for a charge air cooler, comprising:

an opening plane with a plurality of openings for attachment of tubes;

a collar encircling the perimeter of the opening plane and protruding at least partially above the opening plane; and guiding protrusions comprising a first group of guiding protrusions and a second group of guiding protrusions, the plurality of guiding protrusions being located along an inner perimeter of the collar adjacent to said openings and configured to guide the tubes into the openings upon insertion, wherein the openings have rectangular shape with longer sides and shorter sides and are arranged in series along their longer sides, wherein the first group of guiding protrusions is located adjacent the longer sides of the openings, while the second group of guiding protrusions is located adjacent the shorter sides of the openings, wherein the collar has a rounded inside collar edge, the openings have rounded inside opening edges, and each guiding protrusion forms a flat surface which connects tangentially with the inside collar edge and a respective adjacent inside opening edge.

2. The header according to claim 1, wherein the flat surface is inclined with respect to the opening plane at an angle comprised in the range 30-60°.

3. The header according to claim 1, wherein the rounded inside collar edge has a first radius, the rounded inside opening edges have a second radius, and the first radius is greater than or equal to the second radius.

4. The header according to claim 1, wherein the first group of guiding protrusions have a first width, and the second group of guiding protrusions have a second width, and wherein the first width is equal to the second width.

5. The header according to claim 4, wherein each guiding protrusion of the first group of guiding protrusions is separated with respect to an adjacent guiding protrusion along the inner perimeter by a distance, wherein a ratio of the first width and the distance is 2/15.

6. The header according to claim 1, wherein the second group of guiding protrusions are located in the middle of the short sides.

* * * * *